UNITED STATES PATENT OFFICE.

WM. G. HERMANCE, OF WEST SANDLAKE, NEW YORK.

IMPROVED COMPOUND OIL FOR BURNING AND LUBRICATING.

Specification forming part of Letters Patent No. 38,825, dated June 9, 1863.

*To all whom it may concern:*

Be it known that I, WILLIAM G. HERMANCE, of West Sandlake, in the county of Rensselaer and State of New York, have invented a new and Improved Oil for Illuminating, Lubricating, and other Purposes; and I do hereby declare that the following is a full, clear, and exact description thereof.

The object of my invention is to produce a cheap and safe oil for illuminating, lubricating, and for any and all purposes for which oil is now used, by combining or intermixing with any of the fish-oils or other animal or vegetable oils or fatty substances any one of the mineral oils—such, for instance, as the refined coal-oil or kerosene, petroleum, naphtha, or benzole—in suitable proportions according to the requirements of the oil, as will be hereinafter described.

For illuminating purposes I combine any of the mineral oils, either in a crude or refined state, with any one of the vegetable or animal oils or fatty substances in the proportion of about eight parts of the former to one part of the latter. When the oils are in a fluid state, as ordinarily furnished to the market, they are simply mixed together without the application of heat, and it will be found that the two ingredients will be generally held in solution and intimately mixed; but where it is found that the heavier oil does not readily mix with the lighter the solution may be rendered complete by the application of heat to the vat containing the oils. The oil thus prepared is found to be less volatile than the mineral oils unmixed, and forms an unexplosive mixture which may be burned in a common oil or "fluid" lamp, with or without a chimney, giving a brighter and cheaper light than any oil now in use.

The proportions of each ingredient forming the composition may, for lubricating purposes, be reversed, and one part of the mineral oil may be mixed with eight parts of the animal or vegetable oil, and these proportions will give a good lubricating-oil for machinery, for treating wool, and any other purpose for which oils are used in machinery.

What I claim as my invention, and desire to secure by Letters Patent, is—

The compound produced by the admixture of fish or other animal or other vegetable oil with mineral oil, substantially in the proportions herein described.

WM. G. HERMANCE.

Witnesses:
BURTON A. THOMAS,
JEFFREY P. THOMAS.